United States Patent
Alemdar et al.

(10) Patent No.: US 12,156,027 B2
(45) Date of Patent: Nov. 26, 2024

(54) ULTRA-WIDE BAND DEVICE FINGERPRINTING

(71) Applicant: Robert Bosch GmbH, Stuttgart (DE)

(72) Inventors: Kubra Alemdar, Boston, MA (US);
Vivek Jain, Sunnyvale, CA (US);
Sushanta Mohan Rakshit, Santa Clara, CA (US)

(73) Assignee: Robert Bosch GmbH, Stuttgart (DE)

(*) Notice: Subject to any disclaimer, the term of this patent is extended or adjusted under 35 U.S.C. 154(b) by 221 days.

(21) Appl. No.: 17/749,783

(22) Filed: May 20, 2022

(65) Prior Publication Data
US 2023/0379702 A1    Nov. 23, 2023

(51) Int. Cl.
*H04W 12/06* (2021.01)
*H04B 1/717* (2011.01)
*H04W 12/79* (2021.01)

(52) U.S. Cl.
CPC .......... *H04W 12/06* (2013.01); *H04B 1/7172* (2013.01); *H04W 12/79* (2021.01)

(58) Field of Classification Search
None
See application file for complete search history.

(56) References Cited

U.S. PATENT DOCUMENTS

| | | | | | |
|---|---|---|---|---|---|
| 7,724,717 | B2 * | 5/2010 | Porras | ................... | H04W 12/06 370/332 |
| 8,249,028 | B2 * | 8/2012 | Porras | ................... | H04W 99/00 370/335 |
| 9,367,744 | B2 * | 6/2016 | Wang | ............... | H04N 21/44008 |
| 10,397,080 | B2 * | 8/2019 | Brik | ........................ | H04L 47/20 |
| 2010/0207732 | A1 * | 8/2010 | Patwari | ............... | H04W 12/126 340/10.1 |
| 2023/0324540 | A1 * | 10/2023 | Popescu | ................ | G01S 13/867 342/52 |

OTHER PUBLICATIONS

Cekic et al., Robust Wireless Fingerprinting: Generalizing Across Space and Time, arXiv:2002.10791, 2020.
Corbalán et al., Ultra-wideband Concurrent Ranging, Association for Computing Machinery, Transactions on Sensor Networks, vol. 1, No. 1, Article 1, Jan. 2020.
Jian et al., Deep Learning for RF Fingerprinting: A Massive Experimental Study, IEEE Internet of Things Magazine, vol. 3, Issue 1, Mar. 2020.
Sankhe et al., ORACLE: Optimized Radio Classification through Convolutional Neural Networks, IEEE INFOCOM 2019, IEEE Conference on Computer Communications, 2019.

* cited by examiner

*Primary Examiner* — Shirley X Zhang
(74) *Attorney, Agent, or Firm* — Brooks Kushman P.C.

(57) ABSTRACT

Device fingerprinting is provided for ultra-wide band (UWB) communications. A wireless receiver receives wireless signals including an UWB packet sent from a transmitter. Channel impulse response (CIR) data is extracted from the UWB packet. A device fingerprint of the transmitter is created according to the CIR data, the device fingerprint being representative of physical properties of the wireless signals of the UWB packet. The transmitter is authenticated by the receiver based on the device fingerprint.

27 Claims, 12 Drawing Sheets

ULTRA-WIDE BAND DEVICE FINGERPRINTING

TECHNICAL FIELD

Aspects of the present disclosure generally relate to fingerprinting devices using ultra-wide band (UWB) signal characteristics.

BACKGROUND

Radio frequency (RF) fingerprinting is a physical layer approach for identifying transmitters based on subtle distortions that are introduced in their waveforms. These distortions may be caused by imperfections that occur during the manufacturing process of electronic components, such as mixers, oscillators, power amplifiers, digital to analog converters, etc., that compose the transmitter chain. These effects further give rise to so called 'impairments' including in-phase and quadrature (I/Q) imbalance, phase noise, carrier frequency offset (CFO), power amplifier nonlinearities, and harmonic distortions.

SUMMARY

In one or more illustrative examples, a method for device fingerprinting is provided. A wireless receiver receives wireless signals including an UWB packet sent from a transmitter. Channel impulse response (CIR) data is extracted from the UWB packet. A device fingerprint of the transmitter is created according to the CIR data, the device fingerprint being representative of physical properties of the wireless signals of the UWB packet. The transmitter is authenticated by the receiver based on the device fingerprint.

In one or more illustrative examples, a system for device fingerprinting includes a wireless receiver programmed to receive wireless signals including an UWB packet sent from a transmitter; extract CIR data from the UWB packet; create a device fingerprint of the transmitter according to the CIR data, the device fingerprint being representative of physical properties of the wireless signals of the UWB packet; and authenticate the transmitter based on the device fingerprint.

In one or more illustrative examples, a non-transitory computer-readable medium comprises instructions for device fingerprinting that, when executed by a wireless receiver, cause the wireless receiver to perform operations including to receive wireless signals including an UWB packet sent from a transmitter; extract CIR data from the UWB packet; create a device fingerprint of the transmitter according to the CIR data, the device fingerprint being representative of physical properties of the wireless signals of the UWB packet; and authenticate the transmitter based on the device fingerprint.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications.

RF fingerprinting may utilize raw I/Q samples collected from transmitters as well as data processed in the form of equalized signals to identify device imperfections. The cumulative impact of these device imperfections, and hence the subtle distortions introduced in the waveform, may collectively be unique to each radio. Thus, these imperfections may be used as a device fingerprint to identify an individual emitter.

Aspects of the disclosure relate to utilizing UWB CIR and/or its metadata along with signal processing to fingerprint UWB transmitting devices. This may be done to provide authentication as primary or secondary method for internet of things (IOT) applications, including those requiring access control. For instance, a fingerprinting approach may be used to authenticate a given transmitting device from a given pool of authorized transmitters. To further enhance system capacity, impairments (or modifications) to transmitted signal may be added, such as changing clock frequency offset of radio hardware, pulse shape or pulse width, or using a variable transmit power pattern.

A system may include one or more authorized access (transmitting) devices. A method may allow a given receiver to differentiate between transmitting devices and thereby authenticate them based on physical properties of wireless signals transmitted by the respective devices. Even if the device is perfectly cloned with all security credentials, a receiver may still be able to differentiate authenticated devices from fake or cloned devices. Thus, RF device fingerprinting may be used to provide authentication as primary or secondary approach. Further details of the disclosed approach are discussed in detail herein.

Figure 1:
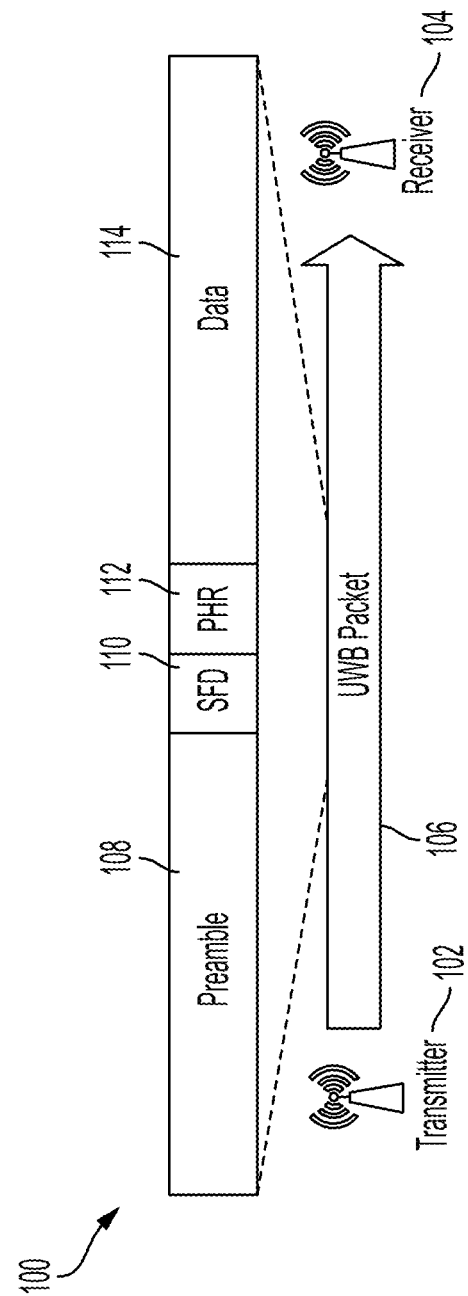
FIG. 1 illustrates an example system including a UWB transmitter sending a UWB packet to a UWB receiver.

FIG. 1 illustrates an example system 100 including a UWB transmitter 102 sending a UWB packet 104 to a UWB receiver 106. As shown, the UWB packet 104 includes a preamble 108, a start frame delimiter (SFD) 110, a physical header (PHR) 112, and payload data 114. As defined for a basic UWB packet 104, the preamble 108 may include 64, 1024, or 4096 symbols, the SFD 110 may include 8 or 64 symbols, the PHR 112 may be 19 bits, and the payload data 114 may include up to 127 coded octets.

The UWB receiver 106 may utilize the bits of the preamble 108 autocorrelated with a pre-determined UWB sequence to determine if a valid UWB packet 104 is included in an incoming stream of data on a wireless channel. However, as the transmitter 102 and the receiver 106 are different devices, so there may be a clock offset between the transmitter 102 and the receiver 106. This clock offset may lead to an imperfect autocorrelation. The output of this autocorrelation may be presented as a CIR at the receiver 106.

The CIR may be modeled as shown in equation (1):

$$h(t) = \sum_{k \in K} a_k e^{j\varphi_k} \delta(t - \tau_k) + v(t) \tag{1}$$

where:

$\alpha_k$ is a complex-valued amplitude;
$\delta(t)$ is a Dirac Delta function;
$v(t)$ is a noise model;
$\varphi_k$ is the channel phase; and
t is time.

It should be noted that while the transmitter 102 and receiver 106 are shown as separate devices, in many examples, the transmitters 102 and receivers 106 may include transceiver devices configured to perform both transmitter 102 and receiver 106 functions. Moreover, while only two devices are shown in FIG. 1, in many examples the system 100 will include many transmitter 102, receiver 106, and/or transceiver devices.

Figure 2:
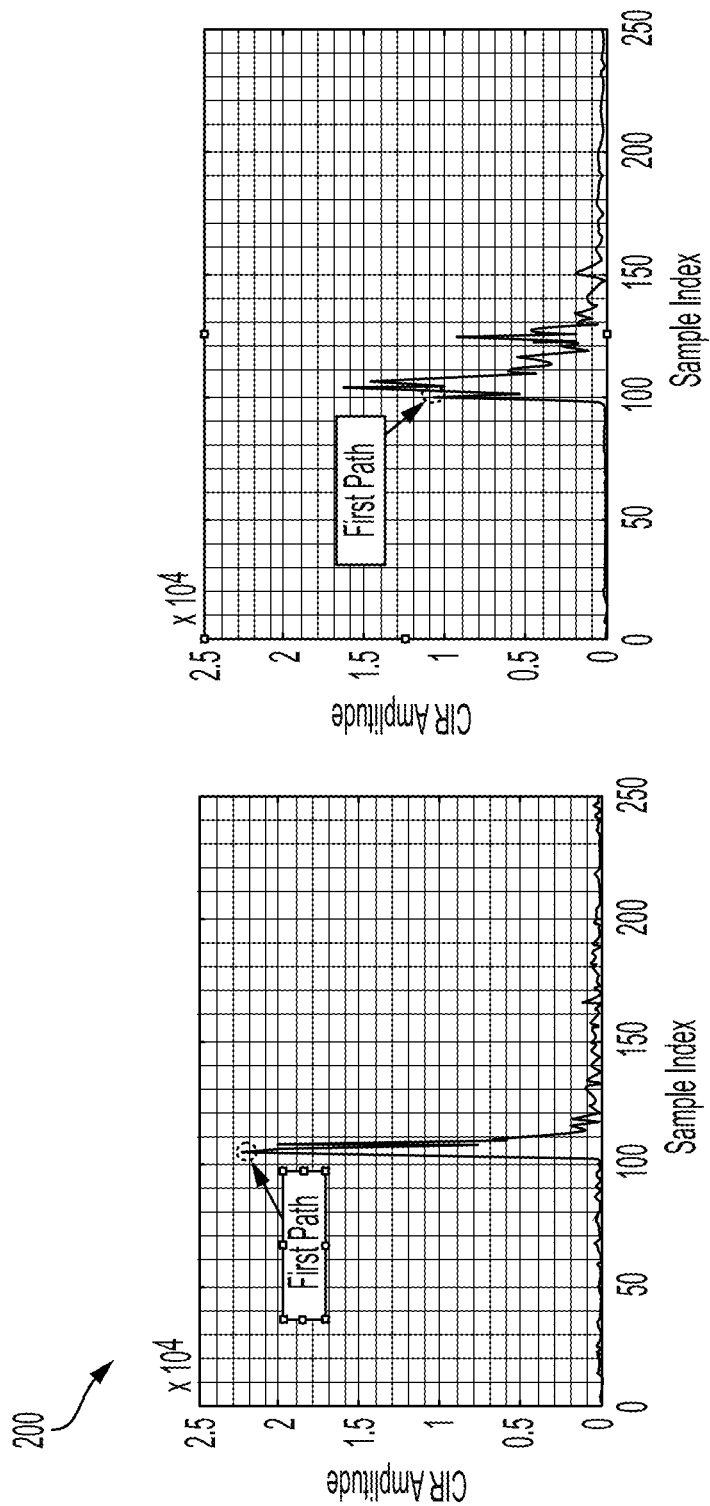
FIG. 2 illustrates an example of channel impulse response (CIR) amplitude over time in real world conditions.

FIG. 2 illustrates an example 200 of CIR amplitude over time in real world conditions. The X-Axis of the graphs shown in the example 200 represent CIR amplitude, while the Y-Axis represents time according to sample index. As can be seen, due to clock offsets being variable in different transmitters 102, transmitters 102 may be differentiated along the time scale as shown. The CIR may include several peaks. Generally, the first peak in good conditions represents the direct line-of-sight (LOS) path. The CIR, in general, may represent a superimposition of several copies of the signal received at the receiver 106. These copies may be formed when signals are reflected in the given environment. These reflections may be collectively referred to as non-LOS (N-LOS) paths.

Figure 3:
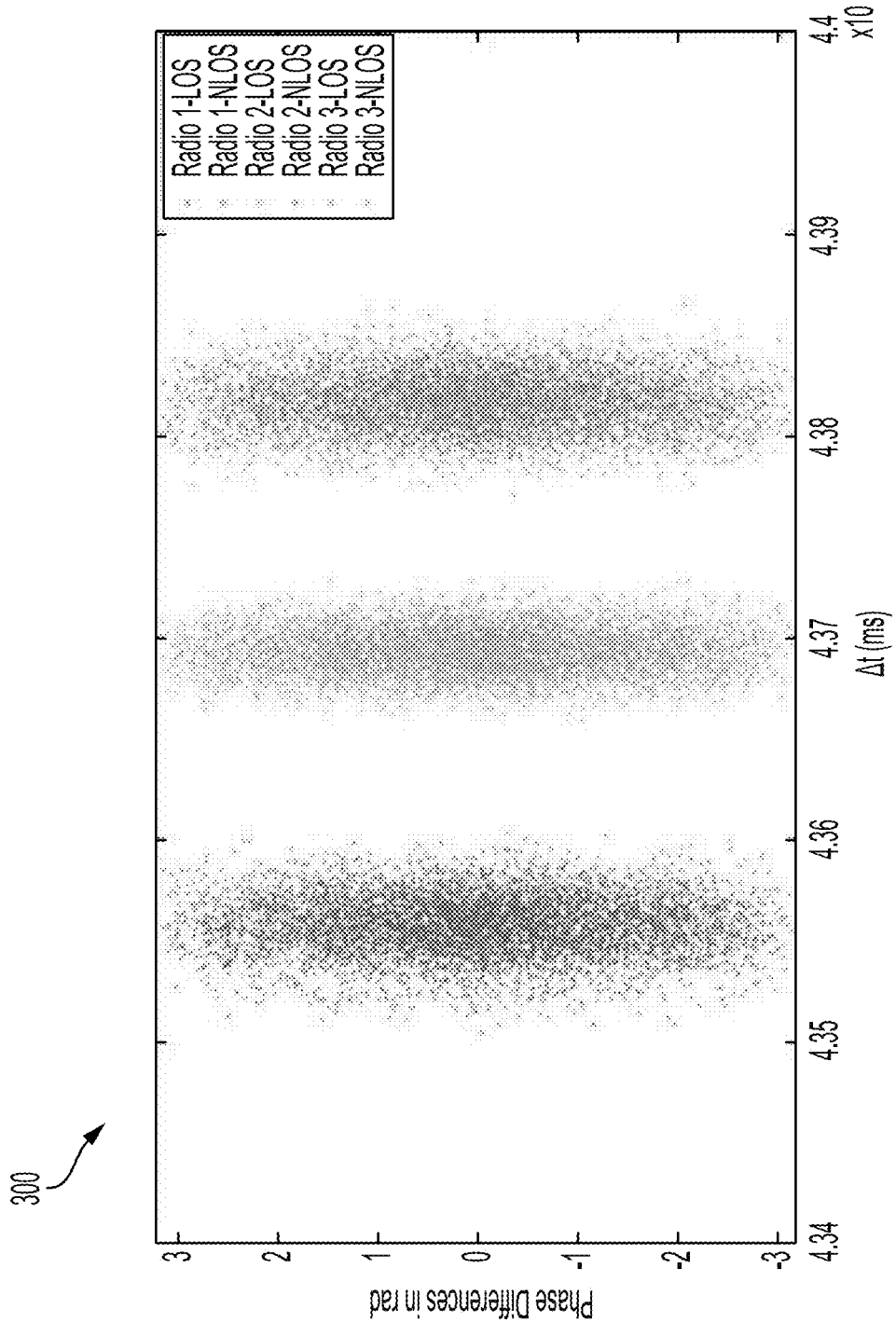
FIG. 3 illustrates an example of phase differences for various transmitters over time.

FIG. 3 illustrates an example graph 300 of phase differences for various transmitters 102 over time. As shown, the phase difference is shown on the Y-Axis in radians, while the X-Axis shows change in time. The example graph 300 shows both LOS and N-LOS phase differences for three example transmitters 102.

The channel phase captured in the CIR may be a useful measure. If adjacent transmitted frames are identified (e.g., as transmitted in short intervals such as 45 ms) and the LOS components are subtracted, channel effects may be potentially eliminated to allow for the capture of the effects of radio clocks on the transmitted data. In an ideal situation, all transmitters 102 would report the exact time difference denoted by frame interval (e.g., 45 ms) and 0 phase difference.

Figure 4:
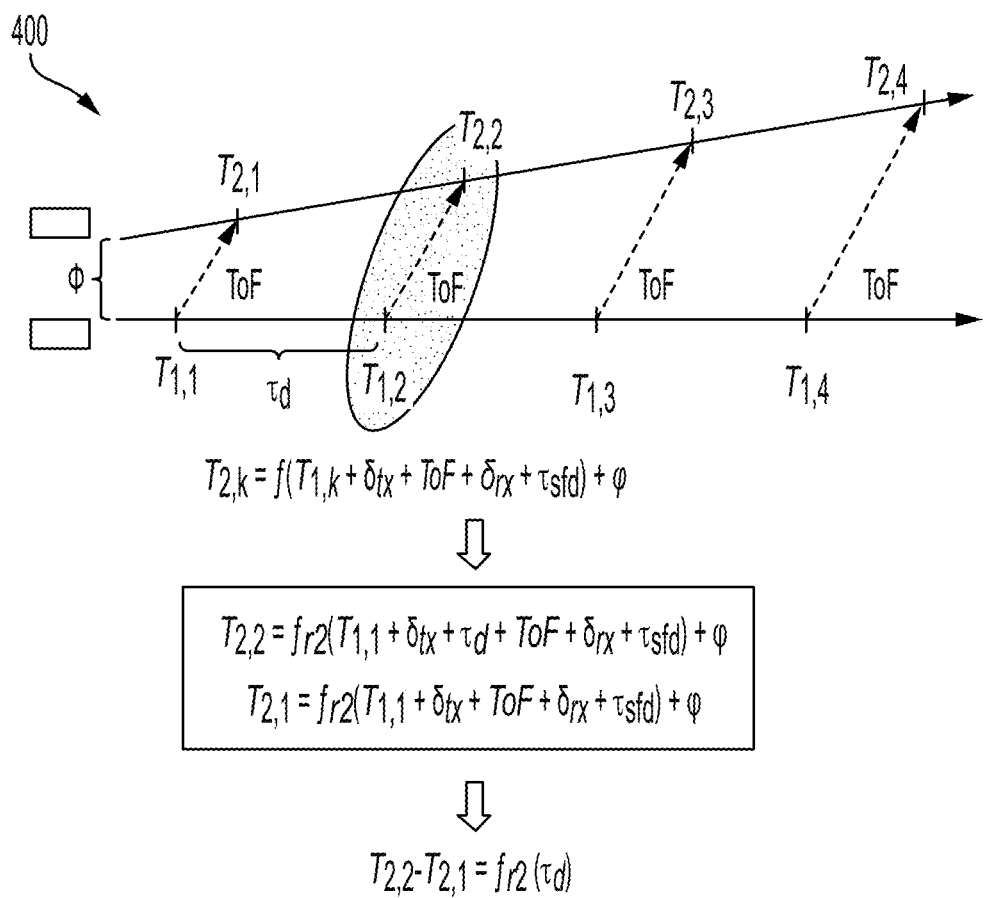
FIG. 4 illustrates an example of the time difference of arrival analysis for pairs of adjacent frames; and packets.

FIG. 4 illustrates an example of time difference of arrival analysis 400 for pairs of adjacent frames. To determine the values, a first path indicates the first signal arrival at the receiver 106 for LOS. The first peak value may be identified using a lead edge detection algorithm. It should be noted that the $\varphi_k$ may include a combination of (i) random initial phase, (ii) antenna delay, (iii) SFD delay, (iv) time of flight (TOF) and (v) CFO. Next, the phase values of first peak in CIR for every frame may be calculated. Additionally, phase differences for every pair of adjacent frames may be calculated, e.g., such that $\Delta\varphi=\varphi_{1,I}-\varphi_{1,I-1}$. Further, time differences of arrival may be computed for every pair of adjacent frames, e.g., as $\Delta t = T_{1,I} - T_{1,I-1}$.

Minute phase differences may be seen between adjacent frames. The benefit of such method is that authentication can happen utilizing the UWB packets 104 exchanged by the transmitter 102 and receiver 106 in general for access control applications. The proposed approach could be used as a primary device authentication method that validates based on radio properties. Or, the proposed approach could be used as a secondary device authentication to complement another authentication such as a key-based or password based primary authentication.

Figure 5:
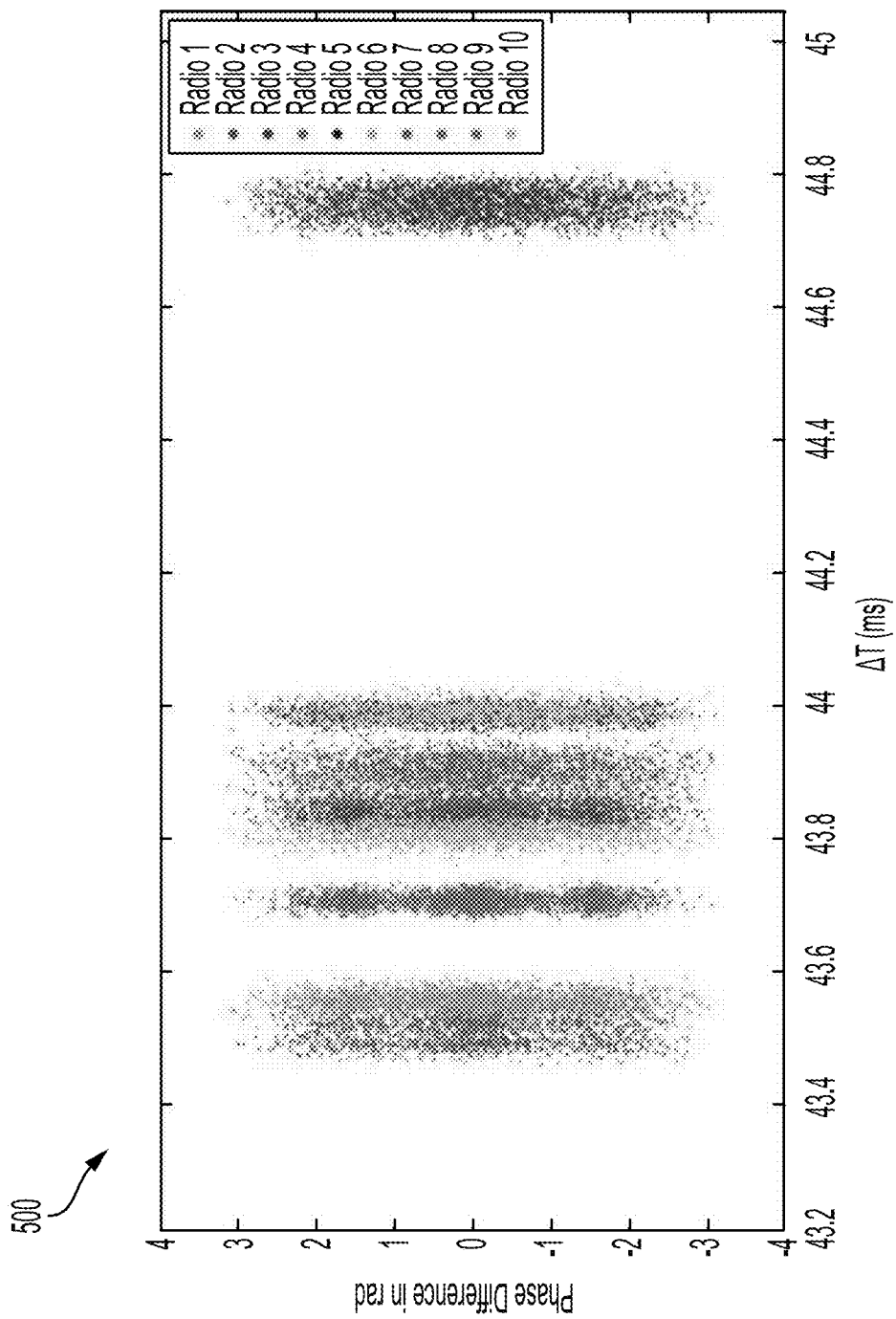
FIG. 5 illustrates an example of ten transmitters in a network communication UWB

FIG. 5 illustrates an example often transmitters 102 in a network communication UWB packets 104. As shown, the phase difference is shown on the Y-Axis in radians, while the X-Axis shows change in time. As can be seen, as the number of transmitters 102 grows it becomes more difficult to ensure that the transmitters 102 may be distinguished separately on a time scale.

To mitigate this inability to discern transmitters 102, variable clock frequencies may be used for transmitting the UWB packets 104 at the transmitter 102. This pattern may already be pre-determined for each registered radio. This enhancement may be integrated again with an established access control method (which may include determining proximity of access device, exchanging security credentials, etc.) or may be a separate pattern before or after determining proximity. The variation introduced in clock offset for the transmitter 102 may be compensated at the receiver 106 by utilizing the offset data received directly from the transmitter 102. One way to directly affect clock offset is by changing the clock offset register value of the transmitter 102.

Figure 6:
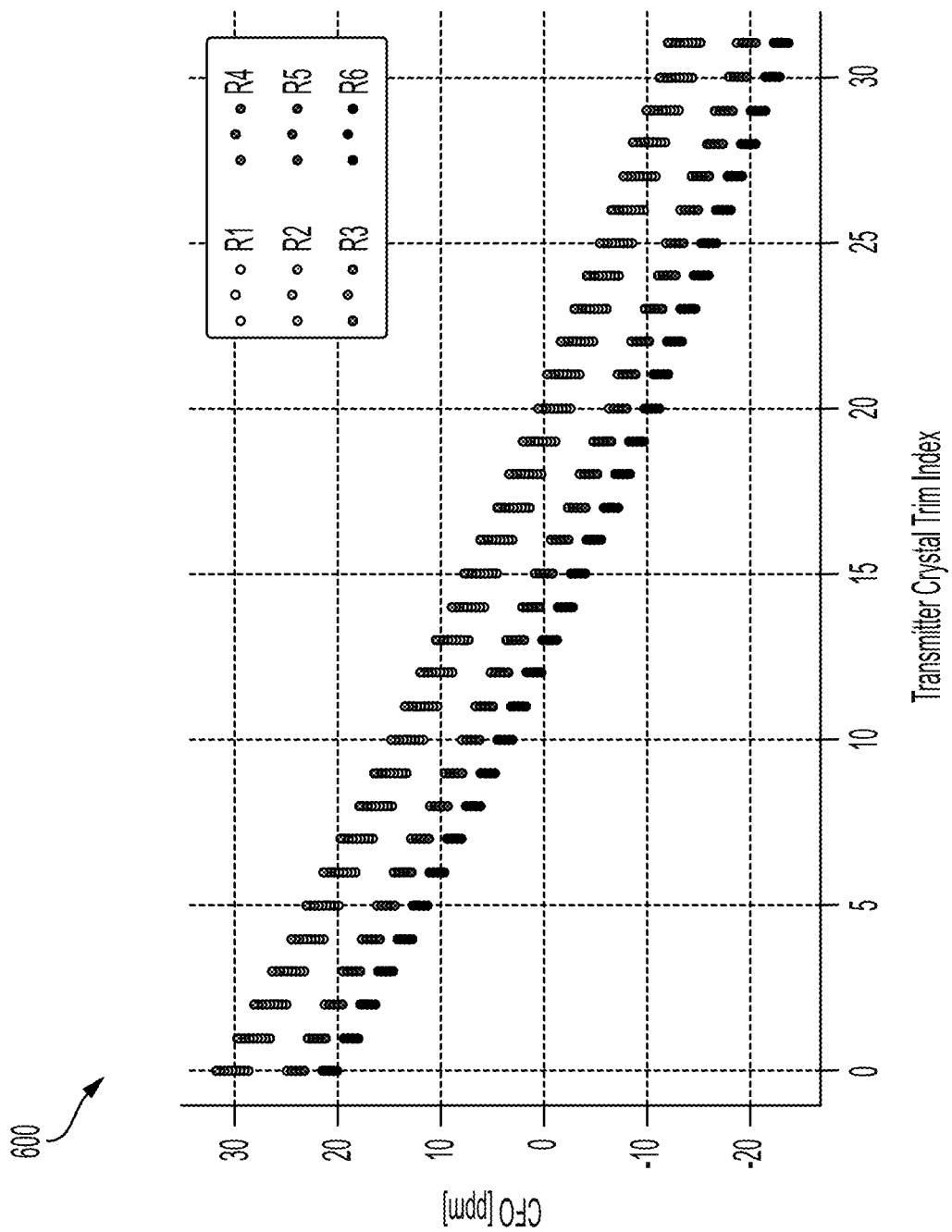
FIG. 6 illustrates an example of clock frequency offset as a function of crystal trim index for six transmitters.

FIG. 6 illustrates an example 500 of clock frequency offset as a function of crystal trim index for six transmitters 102 (R1-R6). As shown, the CFO is shown on the Y-Axis in ppm, while the X-Axis shows transmitter crystal trim index. Due to this correspondence, the clock frequency offset may be manipulated by changing the value of the crystal trim index for the UWB transmitters 102. Further aspects of the clock frequency offset as a function of crystal trim index are discussed in Pablo Corbalán and Gian Pietro Picco "Ultrawideband Concurrent Ranging." *ACM Trans. Sen. Netw.* 16, 4, Article 41 (October 2020), the contents of which are hereby incorporated in its entirety by reference herein.

Figure 7:
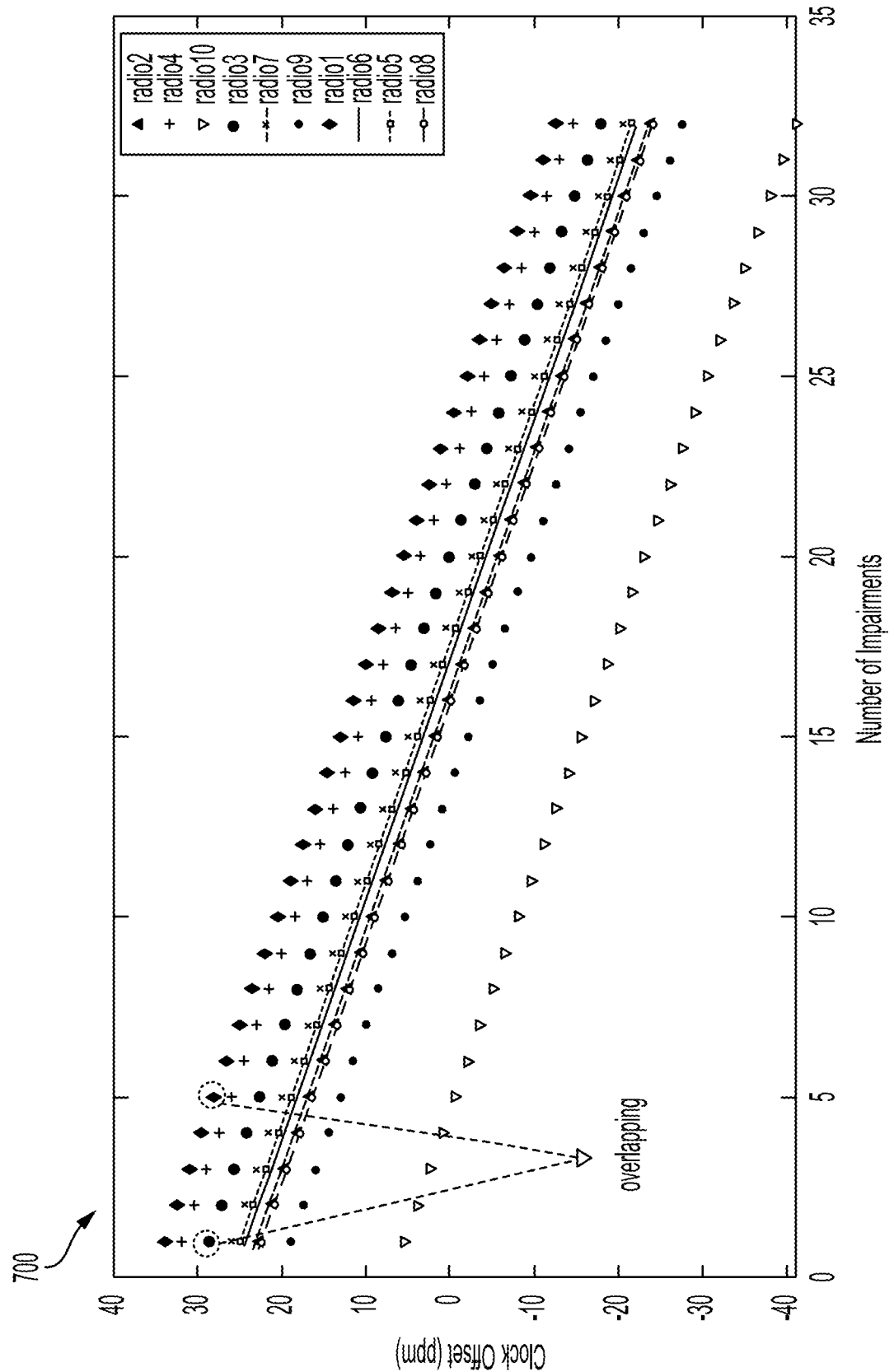
FIG. 7 illustrates an example of overlapping clock offset impairments.

FIG. 7 illustrates an example 700 of overlapping clock offset impairments. As shown, the CFO is shown on the Y-Axis in ppm, while the X-Axis shows the number of impairments for different radios. It is possible that the offset introduced in one transmitter 102 may lead to time overlapping with another registered radio. For an illustrative transmitter 102, up to 32 impairments per radio may be possible with 1.5 ppm step size. This may lead to overall 320 impairment possibilities with an example sample of ten radios. However, these 320 impairments may not all be unique.

An approach for determining unique clock offset impairment sequences may be provided. The approach may be used to select feasible impairments for radios that produce distinguishable clusters.

Given K radios $[r_1, r_2, \ldots, r_k]$ and N clock offset values $[c_0, c_1, \ldots, c_{n-1}]$, a feature space vector may be created with each radio for $c_0$ and a correlation matrix for K radios. The feature space may be defined as matrix for all possible fingerprints as follows:

$$\text{Corr} = \begin{bmatrix} corr_{11} & \cdots & corr_{1k-1} \\ \vdots & \ddots & \vdots \\ corr_{(k-1)1} & \cdots & corr_{k-1k-1} \end{bmatrix}$$

where:
- Th may be determined empirically to set how many distinguishable signatures can be obtained (e.g., overlapping ratio), and value of Th may be adjusted based on the detection accuracy;
- Min(Corr) provides the closest radio feature to $r_1$; and
- Corr<Th provides the closest radio feature to $r_1$ (e.g., overlapping).

Figure 8:
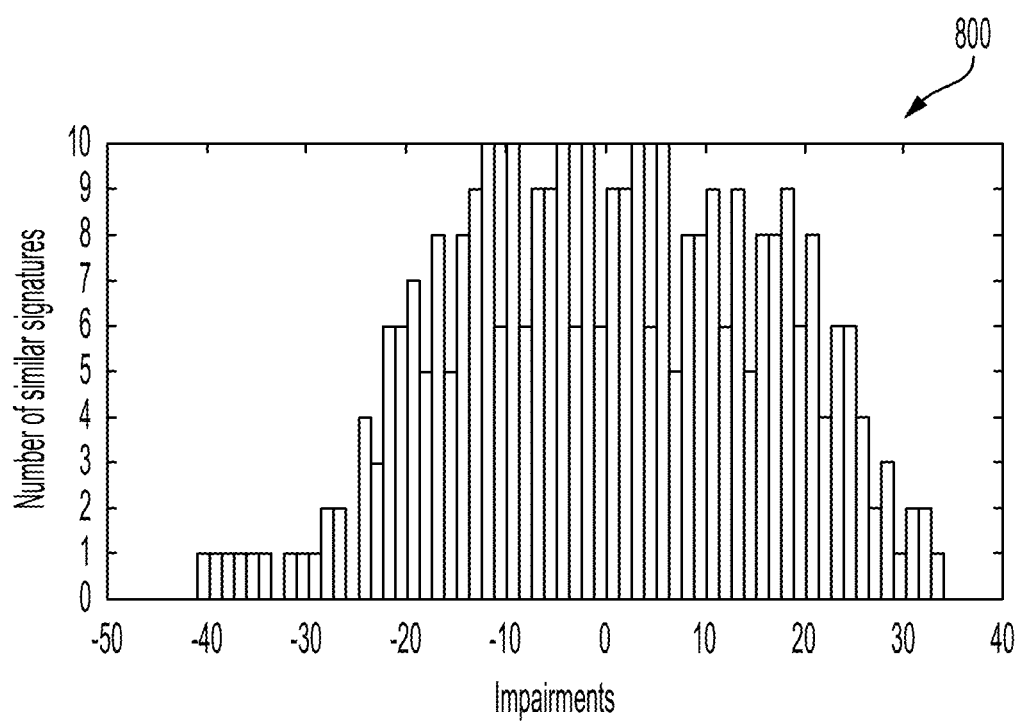
FIG. 8 illustrates an example graph of unique clock offset impairments.

FIG. 8 illustrates an example graph 800 of unique clock offset impairments. In an example, 60 unique signatures may be obtained from all possible fingerprints. As shown, the X-Axis represents the impairment number, while the Y-Axis represents the number of similar signatures according to the correlation.

Figure 9:
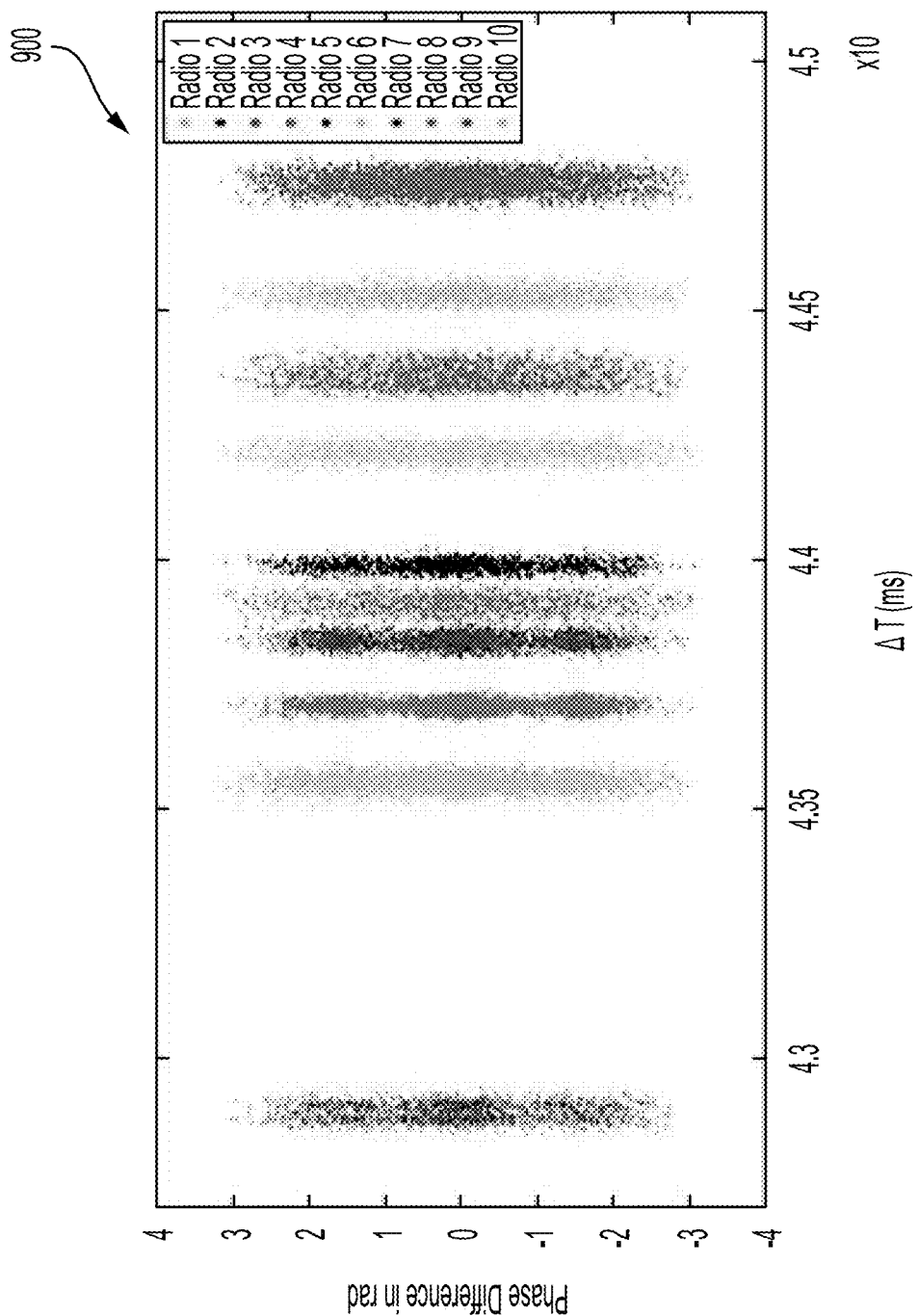
FIG. 9 illustrates the example ten transmitters of FIG. 5 after applying the clock offset impairments.

FIG. 9 illustrates the example ten transmitters 102 of FIG. 5 after applying the clock offset impairments. Similar to FIG. 5, the phase difference is shown on the Y-Axis in radians, while the X-Axis shows change in time. As can be seen, the effect of applying right impairments adds substantial separation compared to the original in FIG. 5. In worst case, if all radios have overlapping offset on time scale then the maximum number of radios in the networks are limited to 32 capped by total number of impairments possible in the transmitter hardware. Theoretically, the total number of transmitters 102 in the network could be the number of unique transmitters 102 multiplied by the total number of possible impairments. However, as we see the results are neither perfect on time scale nor on phase due to practical limitations. Hence the actual number of transmitters 102 possible could be determined by the approach discussed herein.

In an ideal environment, these codes could be introduced only for transmitters 102 with overlapping time scales. However, an intruder's radio may also overlap with any of the registered transmitters 102 leading to a false authentication. To mitigate this issue, a pre-determined pseudo random sequence (where no two transmitters 102 should have same sequence) may be used for the transmitter 102 of each registered access device.

Another method of introducing unique impairments in the transmitter signal is by varying the pulse shape and/or width of the transmitted UWB signal. In such cases, combining with CFO impairments, a larger design space may be provided to create unique transmitting signatures and thereby expand the system capacity. Coding may also be introduced by way of utilizing variable transmit power for adjacent frames, because this would affect the amplitude of first peak power (and also average power) of the received signal. Such method may further add to system capacity. To make the system more secure, transmitter radios may also be allowed to select another set of unique impairments (one or more of the aforementioned approaches such as clock offset, pulse shape, pulse width, transmitter power, etc.) over a constant or variable time period.

Figure 10:
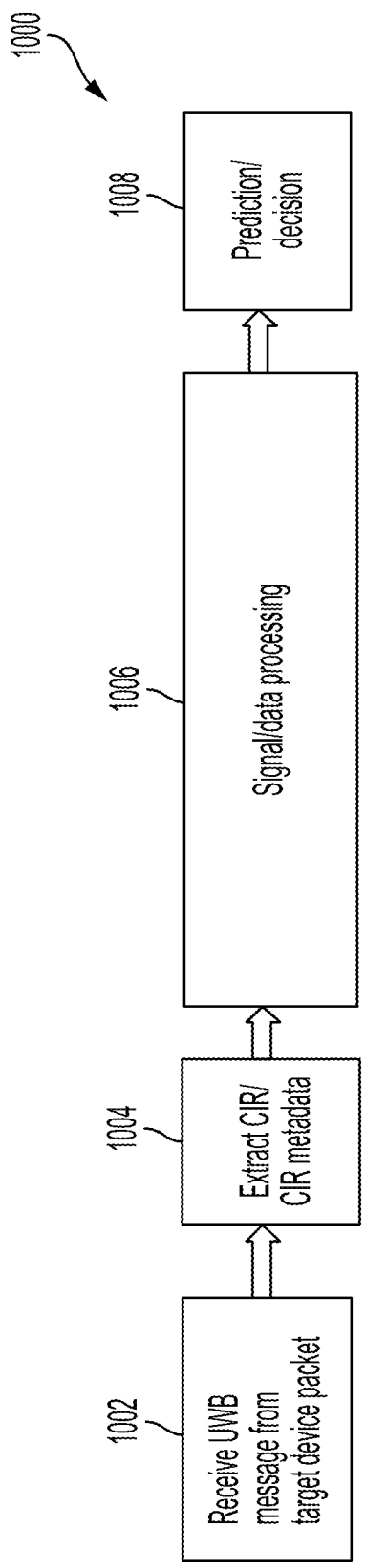
FIG. 10 illustrates an example process for differentiating transmitters along a time scale using CIR data.

FIG. 10 illustrates an example process 1000 for differentiating transmitters 102. In an example the process 1000 may be performed by the receiver 106 in the context of the system 100 shown in FIG. 1.

At operation 1002, the receiver 106 receives a UWB packet 104. The UWB packet 104 may be received from one of a plurality of transmitters 102. An example UWB packet 104 is shown in FIG. 1.

At operation 1004, the receiver 106 extracts the CIR and/or the CIR metadata from the UWB packet 104. In an example, the receiver 106 may utilize the bits of the preamble 108 of the UWB packet 104, autocorrelated with a pre-determined UWB sequence to determine that a valid UWB packet 104 is included in an incoming stream of data on a wireless channel. The output of this autocorrelation may be presented as a CIR at the receiver 106. The CIR may be modeled as shown in equation (1), as discussed above.

At operation 1006, the receiver 106 performs signal processing on the CIR. In an example, the receiver 106 may utilize information from the CIR to identify device imperfections. A cumulative impact of these device imperfections, and hence the subtle distortions introduced in the UWB packet 104, may collectively be unique to each transmitter 102. Thus, these imperfections may be used as a device fingerprint to identify an individual transmitter 102.

At operation 1008, the receiver 106 determines the likely transmitter 102 that sent the UWB packet 104. In an example, the receiver 106 may match the device fingerprint determined at operation 1006 with one (or none) of a set of predefined device fingerprints maintained by or otherwise accessible to the receiver 106. The receiver 106 may accordingly indicate the closest matching transmitter 102, or that no transmitter 102 matches within a predefined threshold likelihood. This matching may be used as a primary or secondary authentication of the transmitter 102. After operation 1008, the process 1000 ends.

Figure 11:
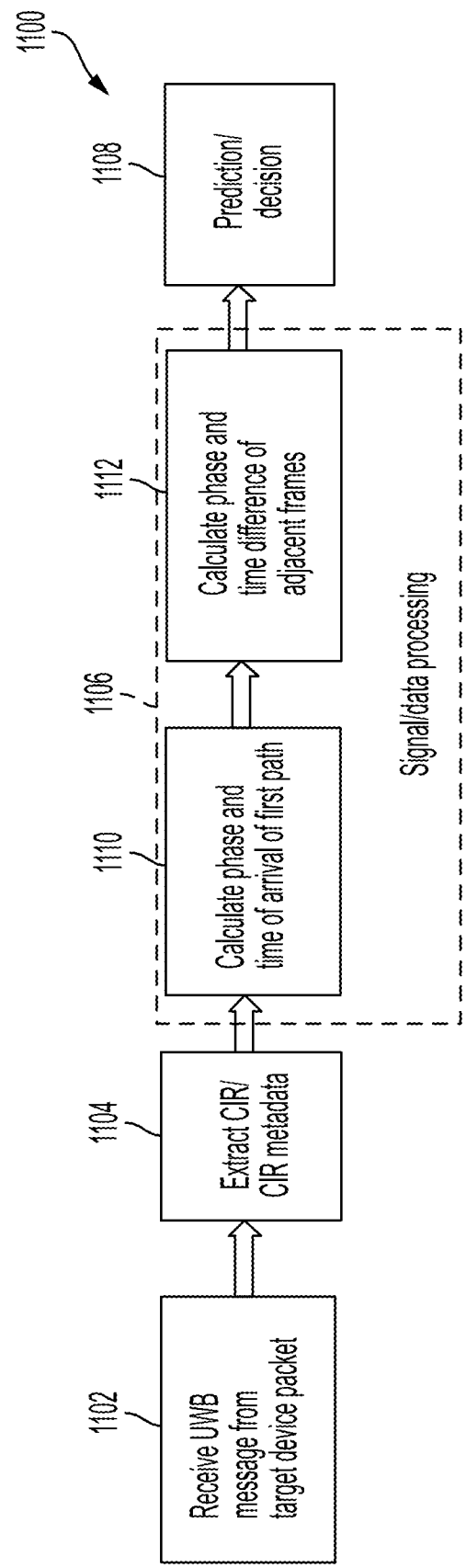
FIG. 11 illustrates an example process for differentiating transmitters utilizing additional signal processing.

FIG. 11 illustrates an example process 1100 for differentiating transmitters 102 utilizing additional signal processing. As with the process 1000, the process 1100 may be performed by the receiver 106 in the context of the system 100 shown in FIG. 1.

Operations 1102, 1104, and 1108 may be performed substantially similar to those of operations 1002, 1004 and 1008, respectively. However, at operation 1106, the receiver 106 may perform additional operations.

As shown, at operation 1110 the receiver 106 calculates phase and time of arrival of the first path. As noted above, the first path indicates the first signal arrival at the receiver 106 for LOS. The first peak value may be identified using a lead edge detection algorithm. As discussed herein and shown in FIG. 4, the $\varphi_k$ may include a combination of (i) random initial phase, (ii) antenna delay, (iii) SFD delay, (iv) TOF and (v) CFO.

At operation 1112 the receiver 106 calculates phase and time differences of adjacent frames. Additionally, phase differences for every pair of adjacent frames may be calculated, e.g., such that $\Delta\varphi = \varphi_{1,i} - \varphi_{1,i-1}$. Further, time differences of arrival may be computed for every pair of adjacent frames, e.g., as $\Delta t = T_{1,i} - T_{1,i-1}$.

Continuing from operation 1102, at operation 1108 the receiver 106 determines the likely transmitter 102 that sent the UWB packet 104 utilizing the phase difference information. An example illustration of the differentiation is shown in the example 500 of FIG. 5.

Figure 12:
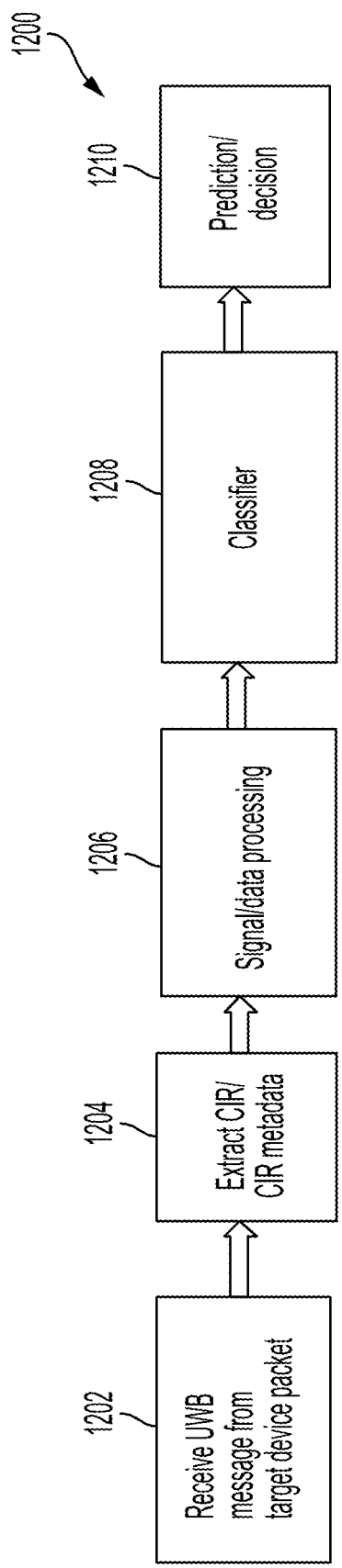
FIG. 12 illustrates an example process for differentiating transmitters utilizing a machine learning classifier.

FIG. 12 illustrates an example process 1200 for differentiating transmitters 102 utilizing machine learning. As with the processes 1000 and 1100, the process 1200 may be performed by the receiver 106 in the context of the system 100 shown in FIG. 1.

Operations 1202, 1204, 1206, and 1210 may be performed substantially similar to those of operations 1002 or 1102, 1004 or 1104, 1006 or 1106, 1008 or 1108, respectively. However, at operation 1208, after the signal processing of operation 1206 but before the determination of operation 1210, the receiver 106 may perform additional operations to aid in identifying the transmitter 102.

At operation 1210, the receiver 106 utilizes a machine learning classifier to aid in the determination of which of the transmitters 102 is indicated. The classifier may utilize various algorithms such k-nearest neighbors (kNN), support vector machine (SVM), etc. The classifier may be trained based on an array of samples and features of UWB packet 104 data for the different transmitters 102 of the system 100 (and potentially based on unknown transmitters 102 as well). At runtime, the classifier may provide scores for the likelihood of the data being from each of the transmitters 102, or in another example may provide a binary yes or no to indicate whether the transmitter 102 is known or unknown. To improve the reliability of the classifier, the input data may be normalized or scaled before being input. The decision at operation 1212 may be based on the classification performed at operation 1210.

Figure 13:
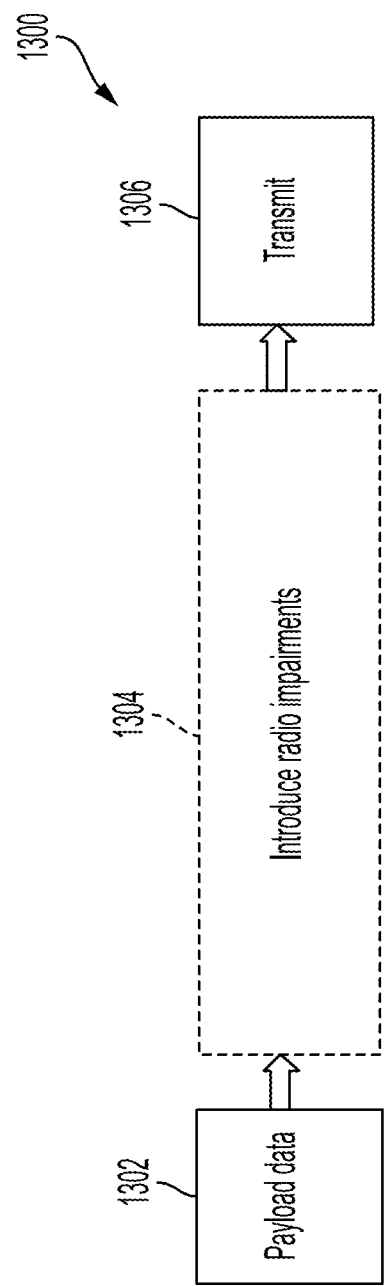
FIG. 13 illustrates an example process for sending UWB packets from a transmitter for identification by the receiver.

FIG. 13 illustrates an example process 1300 for sending UWB packets 104 from a transmitter 102 for identification by the receiver 106. The process 1300 may be performed by one of the transmitters 102 in the context of the system 100 shown in FIG. 1.

At operation 1302, the transmitter 102 prepares payload data 114 to send in a UWB packet 104. The payload data 114 may be specific to the message to be sent and are not relevant to the operation of the process 1300.

At operation 1304, the transmitter 102 introduces radio impairments into the UWB packet 104 to be sent. These impairments may include clock offset, pulse shape, pulse width, transmitter power, etc., as discussed in detail herein.

At operation 1306, the transmitter 102 sends the UWB packet 104. The UWB packet 104 may then be captured by the receiver 106. An identification of the transmitter 102 according to the sent UWB packet 104 may be performed using one of the processes 1000, 1100, or 1200 discussed above with respect to the receiver 106.

Figure 14:
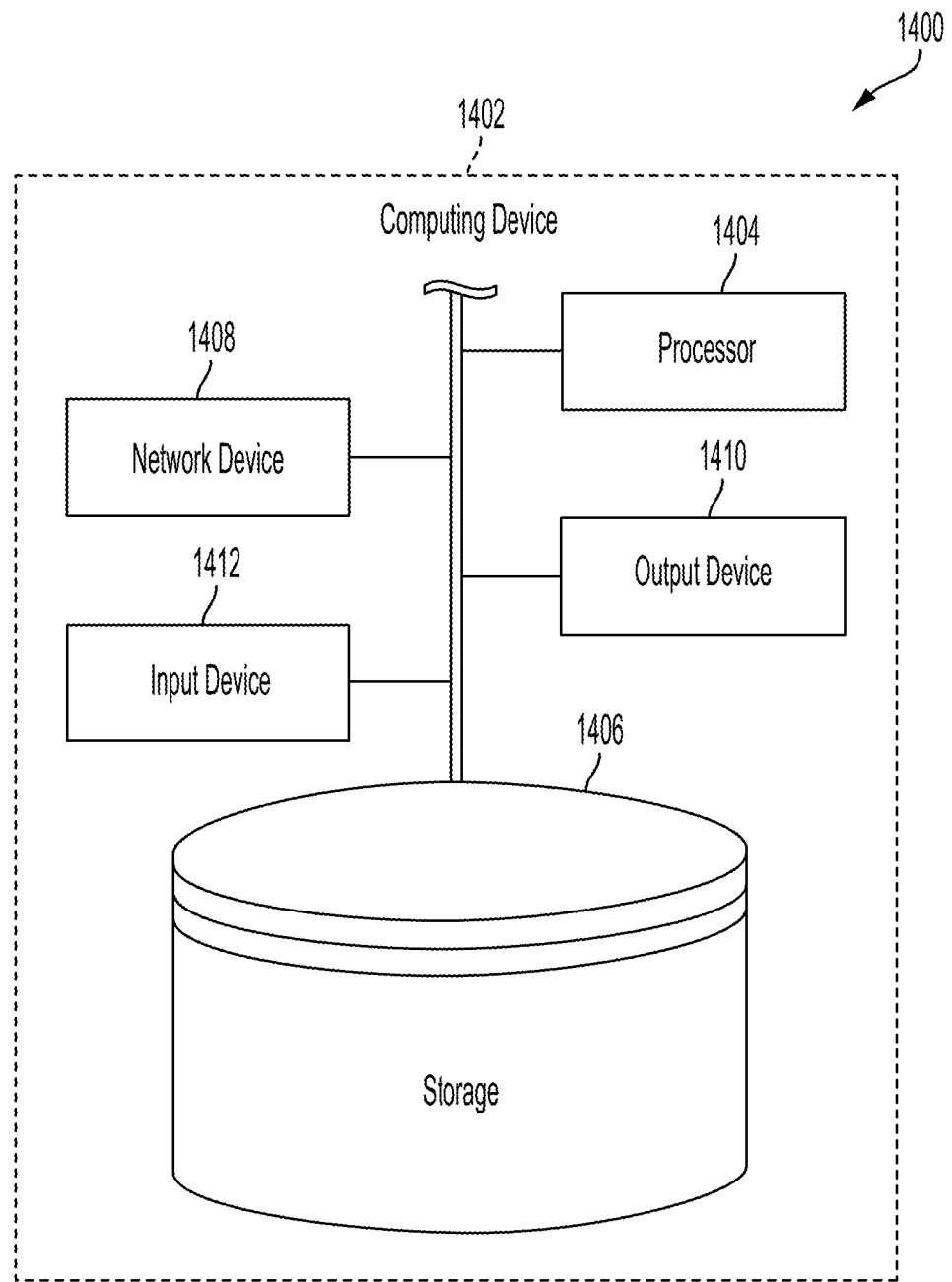
FIG. 14 illustrates an example of a computing device for use as the transmitter or receiver or transceiver in the context of FIG. 1.

FIG. 14 illustrates an example 1400 of a computing device 1402. Referring to FIG. 14, and with reference to FIGS. 1-13, the transmitters 102 and receivers 106 may be examples of such computing devices 1402. As shown, the computing device 1402 may include a processor 1404 that is operatively connected to a storage 1406, a network device 1408, an output device 1410, and an input device 1412. It should be noted that this is merely an example, and computing devices 1402 with more, fewer, or different components may be used.

The processor 1404 may include one or more integrated circuits that implement the functionality of a central processing unit (CPU) and/or graphics processing unit (GPU). In some examples, the processors 1404 are a system on a chip (SoC) that integrates the functionality of the CPU and GPU. The SoC may, optionally, include other components such as, for example, the storage 1406 and the network device 1408 into a single integrated device. In other examples, the CPU and GPU are connected to each other via a peripheral connection device such as peripheral component interconnect (PCI) express or another suitable peripheral data connection. In one example, the CPU is a commercially available central processing device that implements an instruction set such as one of the x86, ARM, Power, or microprocessor without interlocked pipeline stage (MIPS) instruction set families.

Regardless of the specifics, during operation the processor 1404 executes stored program instructions that are retrieved from the storage 1406. The stored program instructions, accordingly, include software that controls the operation of the processors 1404 to perform the operations described herein. The storage 1406 may include both non-volatile memory and volatile memory devices. The non-volatile memory includes solid-state memories, such as negative-AND (NAND) flash memory, magnetic and optical storage media, or any other suitable data storage device that retains data when the system is deactivated or loses electrical power. The volatile memory includes static and dynamic random-access memory (RAM) that stores program instructions and data during operation of the system.

The GPU may include hardware and software for display of at least two-dimensional (2D) and optionally three-dimensional (3D) graphics to the output device 1410. The output device 1410 may include a graphical or visual display device, such as an electronic display screen, projector, printer, or any other suitable device that reproduces a graphical display. As another example, the output device 1410 may include an audio device, such as a loudspeaker or headphone. As yet a further example, the output device 1410 may include a tactile device, such as a mechanically raisable device that may, in an example, be configured to display braille or another physical output that may be touched to provide information to a user.

The input device 1412 may include any of various devices that enable the computing device 1402 to receive control input from users. Examples of suitable input devices that receive human interface inputs may include keyboards, mice, trackballs, touchscreens, voice input devices, graphics tablets, and the like.

The network devices 1408 may each include any of various devices that enable the transmitters 102 and receivers 106 to send and/or receive data from external devices over networks (such as the communications network). Examples of suitable network devices 1408 include an UWB interface, but may also include one or more of an Ethernet interface, a Wi-Fi transceiver, a cellular transceiver, or a BLUETOOTH or BLUETOOTH Low Energy (BLE) transceiver, or other network adapter or peripheral interconnection device that receives data from another computer or external data storage device, which can be useful for receiving large sets of data in an efficient manner.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated.

While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A method for device fingerprinting, comprising:
   receiving, at a wireless receiver, wireless signals including an ultra-wide band (UWB) packet sent from a transmitter;
   extracting channel impulse response (CIR) data from the UWB packet;
   calculating phase and time arrival of a first path of the wireless signals;
   calculating phase differences of adjacent frames of the wireless signals;
   calculating time differences of arrival for adjacent frames of the wireless signals;
   creating a device fingerprint of the transmitter according to the CIR data by utilizing the phase and time differences, the device fingerprint being representative of physical properties of the wireless signals of the UWB packet; and
   authenticating the transmitter by the receiver based on the device fingerprint.

2. The method of claim 1, wherein the authenticating is a secondary authentication used in combination with a key-based or password based primary authentication.

3. The method of claim 1, wherein the authenticating is a standalone authentication of the transmitter.

4. The method of claim 1, further comprising utilizing a classifier to determine an identity of the transmitter, the classifier being trained based on samples and features of UWB packet data of a plurality of system transmitters.

5. The method of claim 4, wherein the plurality of system transmitters includes the transmitter having sent the UWB packet.

6. The method of claim 1, further comprising introducing radio impairments into the wireless signals by the transmitter, the radio impairments including one or more of adjustments to clock offset, pulse shape, pulse width, or transmitter power.

7. The method of claim 6, wherein the radio impairments include a set of unique clock offset impairment sequences determined using a minimum correlation threshold over a feature space matrix for a plurality of transmitters.

8. The method of claim 1, wherein the first path is identified using a lead edge detection algorithm.

9. The method of claim 1, wherein the first path is identified using a first peak detection algorithm.

10. A system for device fingerprinting, comprising:
    a wireless receiver including one or more hardware processors, programmed to:
    receive wireless signals including an ultra-wide band (UWB) packet sent from a transmitter;
    extract channel impulse response (CIR) data from the UWB packet;
    calculate phase and time arrival of a first path of the wireless signals;
    calculate phase differences of adjacent frames of the wireless signals;
    calculate time differences of arrival for adjacent frames of the wireless signals;
    create a device fingerprint of the transmitter according to the CIR data by utilizing the phase and time differences, the device fingerprint being representative of physical properties of the wireless signals of the UWB packet; and
    authenticate the transmitter based on the device fingerprint.

11. The system of claim 10, wherein the authenticate is a secondary authentication used in combination with a key-based or password based primary authentication.

12. The system of claim 10, wherein the authenticate is a standalone authentication of the transmitter.

13. The system of claim 10, wherein the wireless receiver is further programmed to utilize a classifier to determine an identity of the transmitter, the classifier being trained based on samples and features of UWB packet data of a plurality of system transmitters.

14. The system of claim 13, wherein the plurality of system transmitters includes the transmitter having sent the UWB packet.

15. The system of claim 10, further comprising the transmitter, wherein the transmitter is programmed to introduce radio impairments into the wireless signals, the radio impairments including one or more of adjustments to clock offset, pulse shape, pulse width, or transmitter power.

16. The system of claim 15, wherein the radio impairments include a set of unique clock offset impairment sequences determined using a minimum correlation threshold over a feature space matrix for a plurality of transmitters.

17. The system of claim 10, wherein the first path is identified using a lead edge detection algorithm.

18. The system of claim 10, wherein the first path is identified using a first peak detection algorithm.

19. A non-transitory computer-readable medium comprising instructions for device fingerprinting that, when executed by a wireless receiver, cause the wireless receiver to perform operations including to:
    receive wireless signals including an ultra-wide band (UWB) packet sent from a transmitter;
    extract channel impulse response (CIR) data from the UWB packet;
    calculate phase and time arrival of a first path of the wireless signals;
    calculate phase differences of adjacent frames of the wireless signals;
    calculate time differences of arrival for adjacent frames of the wireless signals;
    create a device fingerprint of the transmitter according to the CIR data by utilizing the phase and time differences, the device fingerprint being representative of physical properties of the wireless signals of the UWB packet; and
    authenticate the transmitter based on the device fingerprint.

20. The medium of claim 19, wherein the authenticate is a secondary authentication used in combination with a key-based or password based primary authentication.

21. The medium of claim 19, wherein the authenticate is a standalone authentication of the transmitter.

22. The medium of claim 19, wherein the wireless receiver is further programmed to utilize a classifier to determine an identity of the transmitter, the classifier being trained based on samples and features of UWB packet data of a plurality of system transmitters.

23. The medium of claim 22, wherein the plurality of system transmitters includes the transmitter having sent the UWB packet.

24. The medium of claim 19, wherein the receiver is a transceiver, and further programmed to introduce radio impairments into outgoing wireless signals, the radio impairments including one or more of adjustments to clock offset, pulse shape, pulse width, or transmitter power.

25. The medium of claim 24, wherein the radio impairments include a set of unique clock offset impairment sequences determined using a minimum correlation threshold over a feature space matrix for a plurality of transmitters.

26. The medium of claim 19, wherein the first path is identified using a lead edge detection algorithm.

27. The medium of claim 19, wherein the first path is identified using a first peak detection algorithm.

\* \* \* \* \*